United States Patent [19]

Mickle

[11] Patent Number: 5,603,857
[45] Date of Patent: Feb. 18, 1997

[54] HANDHELD ELECTRIC HEATER FOR REMOVING OR REPLACING SURFACE-MOUNTED INTEGRATED CIRCUITS FROM A CIRCUIT BOARD

[75] Inventor: Joseph H. Mickle, Detroit, Mich.

[73] Assignee: Assembly Technologies International, Inc., New York, N.Y.

[21] Appl. No.: 394,142

[22] Filed: Feb. 24, 1995

[51] Int. Cl.$^6$ ............................... H05B 1/00; B23K 3/02
[52] U.S. Cl. ............................... 219/228; 228/51; 228/55; 228/19
[58] Field of Search ............................... 219/228, 229, 219/227, 230, 231, 240, 241, 221, 243, 85.16, 85.12, 85.13, 85.18; 30/140; 228/51, 55, 19–21, 180.1

[56] References Cited

U.S. PATENT DOCUMENTS

| | | | |
|---|---|---|---|
| 3,050,612 | 8/1962 | Eversole | 219/228 |
| 3,084,649 | 4/1963 | Parstorfer | 219/227 |
| 3,576,969 | 5/1971 | Surty et al. | 219/227 |
| 3,632,973 | 1/1972 | O'Keefe | 219/230 |
| 3,649,809 | 3/1972 | Halstead | 219/228 |
| 4,896,019 | 1/1990 | Hyun | 219/228 |
| 5,147,081 | 9/1992 | Kim | 228/51 |
| 5,152,448 | 10/1992 | Williams | 228/51 |
| 5,241,156 | 8/1993 | Wallgren et al. | 219/233 |
| 5,278,393 | 1/1994 | Kim | 219/228 |

FOREIGN PATENT DOCUMENTS

| | | | |
|---|---|---|---|
| 238303 | 8/1986 | German Dem. Rep. | 219/85.13 |
| 58-93566 | 6/1983 | Japan | 219/228 |
| 62-148081 | 7/1987 | Japan | 228/51 |
| 1-113172 | 5/1989 | Japan | 219/228 |
| 233127 | 12/1968 | U.S.S.R. | 219/228 |
| 2259039 | 3/1993 | United Kingdom | 219/85.12 |

OTHER PUBLICATIONS

Jensen, N. F., "Self–Leveling Soldering Tool", IBM Tech. Disclosure, vol. 11, No. 8, Jan. 1969.

*Primary Examiner*—John A. Jeffery
*Attorney, Agent, or Firm*—Barnes, Kisselle, Raisch, Choate, Whittemore & Hulbert, P.C.

[57] ABSTRACT

An apparatus for removing and/or replacing a surface-mounted integrated circuit that includes electrical heating elements disposed in a planar rectangular array and a handle positioning the element array in heat-conductive contact with the legs on the side edges of a surface-mounted integrated circuit. When electrical energy is applied to the heating elements, the elements and the integrated circuit legs are heated so as to liquify the solder joints between the legs and the circuit board pads. An air pad is positioned within the heating element array for grasping and holding the integrated circuit to facilitate lifting of the circuit from the circuit board, or for holding a replacement integrated circuit on the circuit board, when all of the solder joints have been liquified.

10 Claims, 3 Drawing Sheets

HANDHELD ELECTRIC HEATER FOR REMOVING OR REPLACING SURFACE-MOUNTED INTEGRATED CIRCUITS FROM A CIRCUIT BOARD

The present invention is directed to surface-mounted integrated circuit technology, and more particularly to a method and apparatus for removing and/or replacing a surface-mounted integrated circuit or other surface mounted device on a circuit board assembly.

BACKGROUND AND OBJECTS OF THE INVENTION

Conventional state-of-the-art electronic assembly technology employs so-called surface-mount technology, in which integrated circuits and other components are mounted on the surface of an electronic circuit board. Integrated circuits adapted for surface mounting are of rectangular geometry, with a multiplicity of legs extending in a linear array along each side edge of the rectangular body. The solder connection of each leg to a conductive pad on the surface of the circuit board serves the dual function of mounting the integrated circuit on the circuit board surface and making electrical contact between circuitry within the integrated circuit package and conductor arrays on the surface of the circuit board.

Integrated circuits of the described character can be readily mounted on circuit board employing conventional automated mass-production techniques. However, removal of a surface-mounted integrated circuit from a circuit board for replacement or repair presents a problem. Removal of a surface-mounted integrated circuit is conventionally accomplished by a skilled technician who manually heats each circuit leg or group of legs in turn, and then lifts the leg or legs off of pads when the solder joint has been liquified. Such an operation is both tedious and time-consuming. Consequently, in a commercial service environment, the entire circuit board assembly containing a defective integrated circuit is normally replaced rather than repaired. Furthermore, the manual disassembly technique so described can damage the integrated circuit, making later assembly to a subsequent circuit board difficult or impossible, and potentially damaging internal circuit components.

It is therefore a general object of the present invention to provide an apparatus and method to facilitate disassembly and/or assembly of a surface-mounted integrated circuit on the underlying circuit board. A more particular object of the present invention is to provide an apparatus and method of the described character that can be readily employed by relatively unskilled personnel. A further object of the present invention is to provide an apparatus and method of the described character than can be economically manufactured, that are easy to use, and that can be employed with integrated circuits of a wide variety of sizes and geometries.

SUMMARY OF THE INVENTION

An apparatus for removing and/or replacing a surface-mounted integrated circuit in accordance with the present invention includes electrical heating elements disposed in a planar rectangular array. Facility is provided for positioning the element array in heat-conductive contact with the legs on the side edges of a surface-mounted integrated circuit. When electrical energy is applied to the heating elements, the elements and the integrated circuit legs contacted thereby are heated so as to liquify the solder joints between the legs and the circuit board pads. The integrated circuit may then be removed by lifting off of the circuit board, or installed by pressing against the circuit board while the solder joints solidify. In the preferred embodiment of the invention, a pneumatic pad is positioned within the heating element array for grasping and holding the integrated circuit to facilitate lifting of the circuit from the circuit board when all of the solder joints have been liquified, or pressing the integrated circuit against the board while the solder solidifies.

The heating elements are connected to a control circuit for applying electrical energy to the elements at a predetermined energy level and/or for a predetermined time duration, either or both of which are operator adjustable. In this way, the level and time duration of the heating operation can be set so as to provide sufficient energy to liquify the solder connections, but not to overheat the integrated circuit legs or internal circuitry. The heating elements are mounted on a head that is removably fastened to an operator handle for manual placement over an integrated circuit to be removed from an underlying circuit board. The electrical and vacuum power sources are energized by a switch mounted on the handle, so that the entire removal tool can be manipulated by a single operator hand, leaving the other hand free to hold the circuit board or perform other needed functions. The removable head can be provided with heating elements in a plurality of sizes and geometries for use in conjunction with integrated circuits with correspondingly differing sizes and geometries.

The method of the present invention for removing and/or installing an integrated circuit surface-mounted on a circuit board by a rectangular array of legs soldered to underlying pads on the circuit board thus comprises the steps of heating all legs of the rectangular array substantially simultaneously to liquify the solder joints affixing the legs to the circuit board surface, and removing or installing the integrated circuit when the solder holding all legs has been liquified. The step of heating all legs simultaneously is carried out by placing heating elements in heat conductive contact with all legs on each side of the integrated circuit rectangular array, and heating all of these heating elements simultaneously, preferably by electrical energy applied to all of the heating elements simultaneously. Removal and/or installation of the integrated circuit on the circuit board after the solder joints have been liquified is assisted in the preferred implementation of the invention by grasping or pressing against the integrated circuit with a pneumatic Dad disposed within the heating element array.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 4:
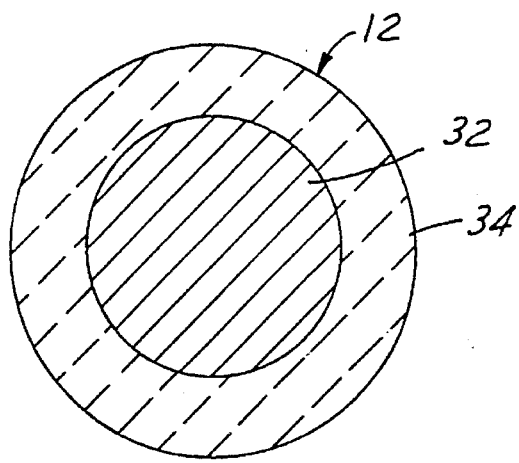
FIG. 4 is a sectional view on an enlarged scale taken substantially along the line 4—4 in FIG. 3.

FIGS. 1–4 illustrate an apparatus 10 in accordance with a presently preferred embodiment of the invention for removing and/or replacing a surface-mounted integrated circuit from a circuit board assembly. Four heating elements 12,14, 16,18 are disposed in a rectangular array of predetermined size and geometry. Each heating element 12,14,16,18 is of generally U-shaped construction, with an elongated base extending along and forming one side of the rectangular array. The ends of each adjacent pair of heating elements 12,14, 14,16, 16,18, and 18,12 are fastened at an associated connection block 20. Connection blocks 20 are carried by a centrally apertured plate 22 at the respective corners of the rectangular array. Each connection block 20 is connected by or within a support leg 24 to a male contact 26. The four male contacts 26 are carried at corresponding corners of an insulator block 28. A disk 30 helps space and support connector legs 24. As best seen in FIG. 4, each heating element 12 comprises a central metal conductor 32 surrounded by a heat-conductive wear-resistant and electrically insulating coating 34 of ceramic, for example. A disk-shaped pneumatic pad 36 is carried by a hollow shaft 38 that is slidably supported within a central aperture of insulator block 28. Pad 36 is disposed within the central aperture of plate 22, has a central opening aligned with the hollow interior of shaft 38.

Figure 1:
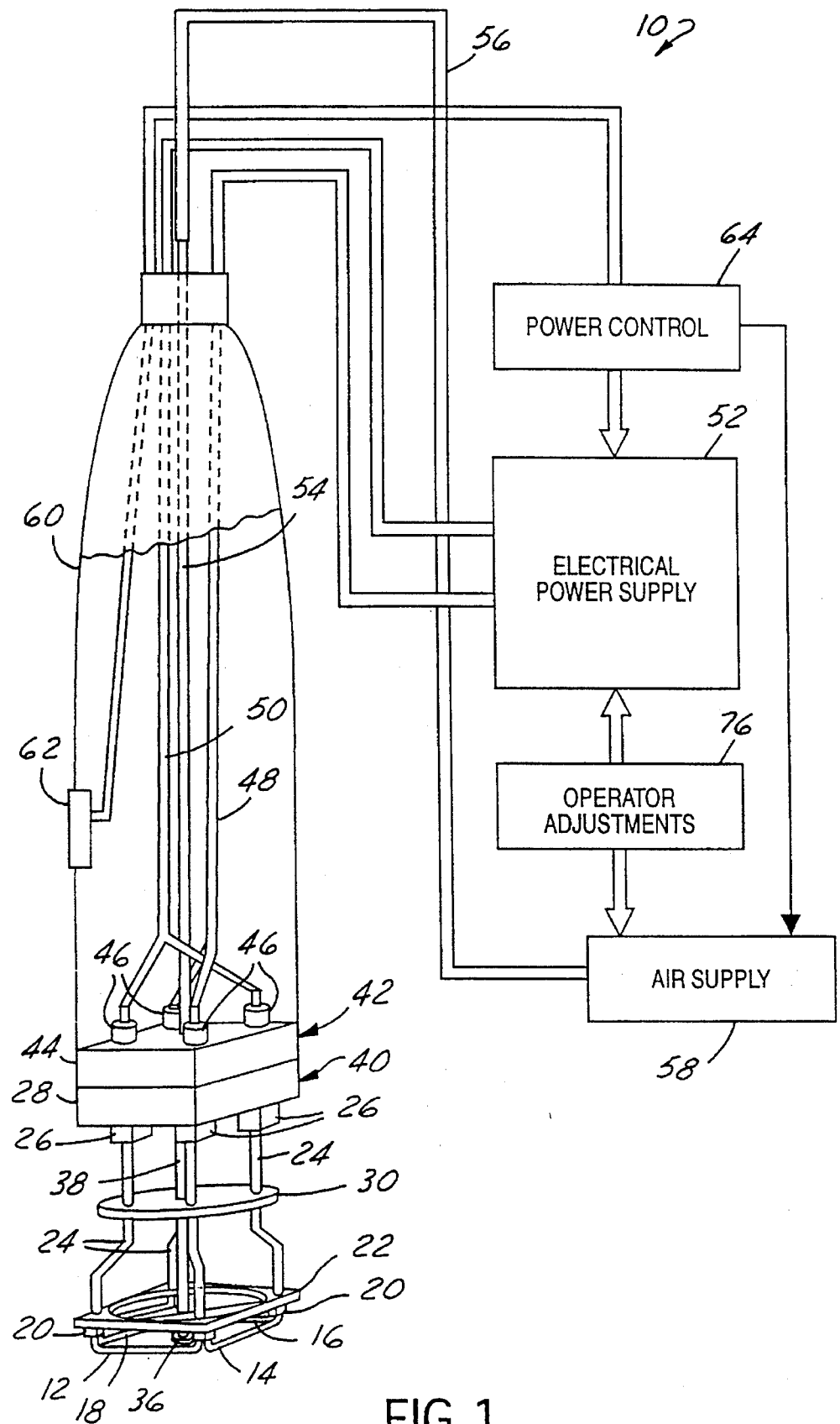
FIG. 1 is a partially schematic and partially functional block diagram that illustrates apparatus for removing and/or installing a surface-mounted integrated circuit in accordance with a presently preferred embodiment of the invention.
Figure 2:
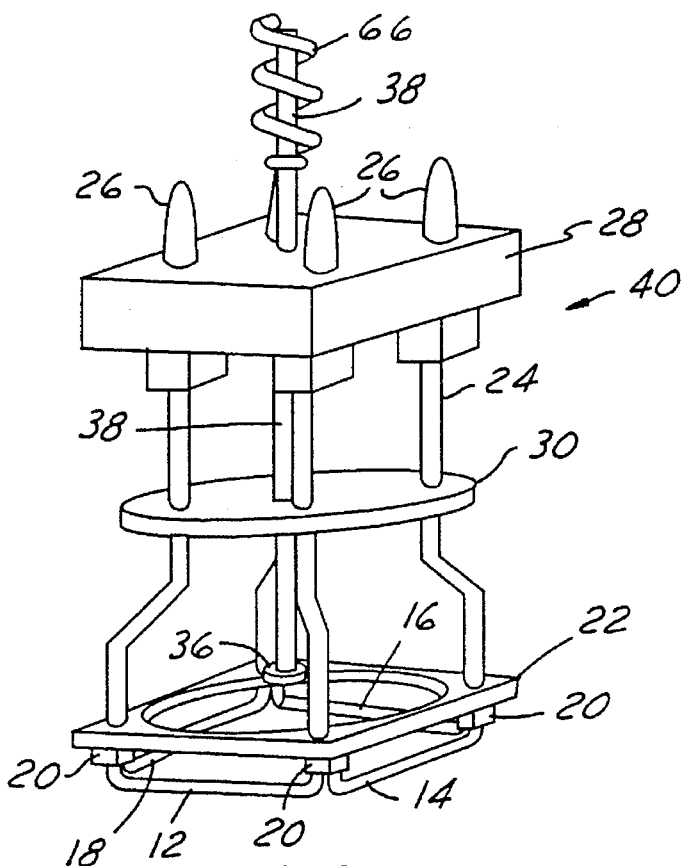
FIG. 2 is a perspective view of a portion of the apparatus illustrated in FIG. 1.
Figure 3:
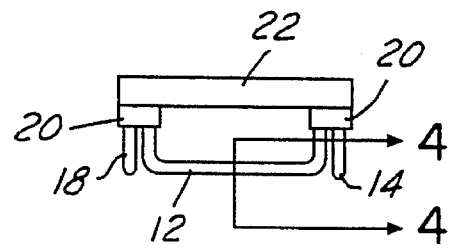
FIG. 3 is an elevational view of a portion of the apparatus illustrated in FIGS. 1 and 2.

Pad 36 and shaft 38, heating elements 12,14,16,18, plate 22 and legs 24 suspending the same from insulator block 28, all form a head assembly 40 that is removably mounted to a handle assembly 42, as illustrated in FIG. 1. That is, handle assembly 42 includes an insulator block 44 having female electrical contacts 46 disposed at the four corners thereof for removably receiving male contacts 26 (FIG. 2) carried by insulator block 28. Friction between contacts 26,46 holds head 40 on handle 42. Contacts 46 at opposed corners of block 44 are connected in pairs by electrical conductors 48,50 to an electrical power supply 52. A hollow shaft 54 extends lengthwise of handle 42, and has an open end adjacent to insulator block 42 for removably receiving the upper end of shaft 38 on head 40. The opposing or upper end of shaft 54 is connected by a suitable tube 56 to an adjustable and selectively operable air supply 58. Handle 42 includes a suitable frame 60 schematically illustrated in FIG. 1 for supporting insulator block 42 and providing a mechanism for grasping by an apparatus operator. An electrical switch 62 is carried by handle 60 at a position for selective actuation by an operator, and is electrically connected to a power control circuit 64. A coil spring 66 surrounds and is fastened to shaft 38 of head 40 for urging pad 36 downwardly and/or limiting movement of shaft 38 with respect to insulator block 28.

Figure 5:
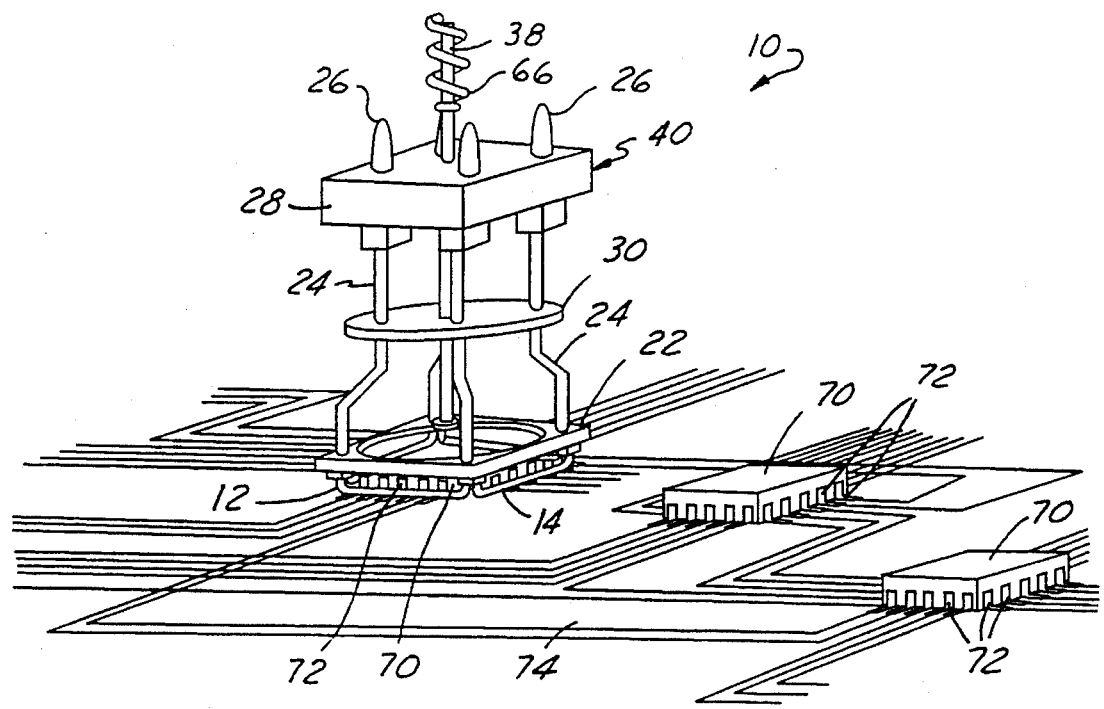
FIG. 5 is a perspective view of a portion of the apparatus illustrated in FIGS. 1 and 2 in use for removing or installing a surface-mounted integrated circuit from a circuit board assembly.
Figure 6:
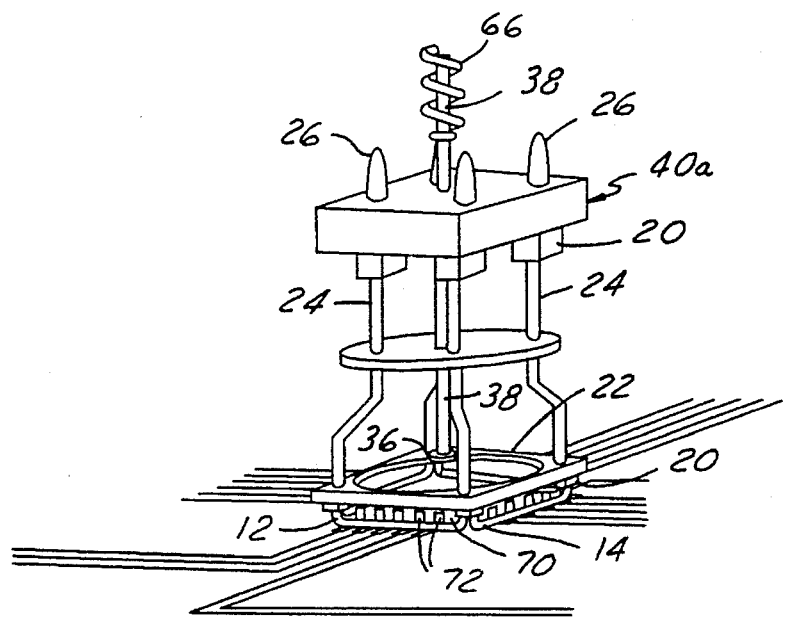
FIG. 6 is a perspective view similar to that of FIG. 5 showing the apparatus of the invention in use for removing or installing a surface-mounted integrated circuit of differing size.

In operation for removing an integrated circuit from a circuit board, apparatus 10 is positioned over a surface-mounted integrated circuit 70, as illustrated in FIG. 5. The lengths of heating elements 12,14,16,18, and the separation between the heating elements, are such that the heating elements are in heat conductive engagement with the legs 72 that mount circuit 70 to the surface of circuit board 74. That is, the engagement between heating elements 12,14,16,18 and legs 72 of integrated circuit 70 should be sufficiently tight as to transfer heat efficiently between the heating elements and the integrated circuit legs, but not so tight as to clamp the integrated circuit. (It will be appreciated that apparatus 10 is illustrated in FIGS. 5 and 6 without handle 42 for purposes of illustration, although the handle and head are normally preassembled to each other and manipulated as a single unit.) With the head so manually positioned over the integrated circuit, switch 62 is activated by the thumb of an operator so as to energize power control 64, which in turn energizes electrical power supply 52 and air supply 58 in a direction to apply a vacuum at pad 36. Electrical power supply 52 applies electrical energy to heating elements 12,14,16,18 at a level and/or for a time duration suitable for heating and liquifying the solder connections for the particular integrated circuit for which head 40 is configured.

Operator adjustments 76 (FIG. 1) are provided for selectively adjusting energy level and/or time duration. For example, power supply 52 may be set through adjustments 76 to apply a current of twenty-five amps at 3.1 VAC for three seconds to liquify the solder connections for a particular integrated circuit. Coating 34 protects the chip from current damage and prevents electrical interconnection of the legs. A larger integrated circuit may require greater current applied to the heating elements and/or greater time duration, while a smaller integrated circuit may require a lower current level and/or a lesser time duration. In any event, with heating elements 12,14,16,18 in heat conductive contact with the legs of the integrated circuit, application of electrical energy to the heating elements liquifies the solder joints at the bases of the legs, and thereby loosens integrated circuit 70 with respect to circuit board 74. Power control 64 also activates air supply 58, which applies a vacuum through hose 56 and shaft 54 to shaft 38 and pad 36. Pad 36, which is positioned by head 40 at or closely adjacent to the top of integrated circuit 70, functions to grasp and lift the integrated circuit off of the circuit board surface after the solder joints have been liquified. Apparatus 10 may then be manipulated by the operator away from circuit board 74, and switch 62 reopened so as to deactivate vacuum source 58. Integrated circuit 70 then either falls from or is easily removed from within the heating element array.

To replace the integrated circuit, tool 10 is placed over a new circuit and positioned on the circuit board. Air supply 58 is activated to apply positive air pressure at pad 36 to hold the circuit against the board. Current is then applied to the heating elements to melt the solder beneath the circuit legs. After the solder has liquified and the current is removed from the heating elements, the air pressure continues to hold the circuit in position until the solder solidifies.

It will be appreciated, of course, that apparatus 10 may be readily configured to remove and/or replace integrated circuits of differing size and/or geometry by merely replacing head 40 with a suitable head 40a (FIG. 6) configured for such integrated circuit. Suitable adjustments would also be made at operator adjustment 76. Thus, apparatus 10 of the present invention, with a single handle unit 42 and a suitable array of heads 40,40a, etc., is adapted for use in conjunction with integrated circuits of many differing standard sizes and geometries.

I claim:

1. Apparatus for removing and/or replacing a surface-mounted integrated circuit from a circuit board, the integrated circuit having a rectangular body with a top surface and four side edges of predetermined size and geometry, and a plurality of legs extending from the side edges for removable solder mounting to a circuit board, said apparatus comprising:

a handle, a head detachably connected to said handle, said head having an electrical heating unit, said heating unit comprising four elongated heating wires spaced from one another and each having opposite ends, said heating wires being mounted on a support frame in a fixed planar array of predetermined size and geometry such that, when said heating unit is placed over said integrated circuit, said heating wires are adapted to extend along and contact all of the legs on all four side edges of the integrated circuit sufficiently tightly as to transfer heat efficiently to said legs, but not so tightly as to clamp said body of the integrated circuit, and means for transmitting electrical energy through said handle to each end of each heating wire to heat said heating wires and the integrated circuit legs in contact therewith when said head is manipulated by said handle to place said heating unit over the integrated circuit.

2. The apparatus set forth in claim 1, wherein said handle has a first insulator block, said head has a second insulator block, and said means for transmitting electrical energy includes interengaged electrical contacts on said first and second insulator blocks.

3. The apparatus set forth in claim 2, wherein said electrical contacts interengage with sufficient friction to hold said head attached to said handle.

4. The apparatus set forth in claim 2, wherein said heating unit is supported on said second insulator block by legs, and electrical energy is transmitted by said electrical energy transmitting means to said heating wires through said legs.

5. The apparatus set forth in claim 4, wherein said electrical contacts interengage with sufficient friction to hold said head attached to said handle.

6. The apparatus set forth in claim 5, and further including holding means mounted on said head and extending within the array of heating elements for engagement with the top surface of the body of the integrated circuit when said heating unit is disposed over the integrated circuit for holding the integral circuit in position, said holding means comprising a pad and means for applying air to said pad, said air applying means comprising interengaged conduits on said head and said handle, and said means for transmitting electrical energy includes an electrical switch on said handle.

7. The apparatus set forth in claim 6, and further comprising a plurality of said heads having heating means of differing sizes and geometries for removing integrated circuits of corresponding different sizes and geometries.

8. The apparatus set forth in claim 1, and further including holding means mounted on said head and extending within the array of heating wires for engagement with the top surface of the body of the integrated circuit when said heating unit is disposed over the integrated circuit for holding the integral circuit in position.

9. The apparatus set forth in claim 8, wherein said holding means comprises a pad and means for applying air to said pad, said air applying means comprising interengaged conduits on said head and said handle.

10. The apparatus set forth in claim 9, wherein said means for transmitting electrical energy includes an electrical switch on said handle.

* * * * *